United States Patent
Wang et al.

(10) Patent No.: US 7,736,536 B2
(45) Date of Patent: Jun. 15, 2010

(54) COMPOSITIONS COMPRISING A MIXTURE OF A BAM PHOSPHOR AND AT LEAST ONE OTHER HEXAALUMINATE

(75) Inventors: Ning Wang, Martinez, CA (US); Yi-Qun Li, Danville, CA (US)

(73) Assignee: Intematix Corporation, Fremont, CA (US)

( * ) Notice: Subject to any disclaimer, the term of this patent is extended or adjusted under 35 U.S.C. 154(b) by 162 days.

(21) Appl. No.: 11/827,352

(22) Filed: Jul. 10, 2007

(65) Prior Publication Data

US 2008/0116421 A1 May 22, 2008

Related U.S. Application Data

(60) Provisional application No. 60/830,269, filed on Jul. 11, 2006.

(51) Int. Cl.
*C09K 11/64* (2006.01)
*C09K 11/80* (2006.01)
*C09K 11/55* (2006.01)

(52) U.S. Cl. .............................................. 252/301.4 R
(58) Field of Classification Search ........... 252/301.4 R
See application file for complete search history.

(56) References Cited

U.S. PATENT DOCUMENTS 5,838,101 A 11/1998 Pappalardo 6,740,262 B2 5/2004 Oshio
2005/0179009 A1* 8/2005 Kim et al. ............. 252/301.4 R
2006/0238101 A1* 10/2006 Choi et al. .................. 313/485

FOREIGN PATENT DOCUMENTS

JP       2002-173677    *  6/2002
WO    WO2005/061658 A1  7/2005

OTHER PUBLICATIONS

Wang, Qian-Ming, et al., "Hydrothermal Mild Synthesis of Microrod Crystalline $Y_xGd_{2-x}(MoO_4)_3$:$Eu^{3+}$Phosphors Derived From Facile Co-Precipitation Precursors," Materials Chemistry and Physics 94 (2005) pp. 241-244.

* cited by examiner

*Primary Examiner*—C. Melissa Koslow
(74) *Attorney, Agent, or Firm*—Fliesler Meyer LLP

(57) ABSTRACT

Disclosed herein are phosphor compositions comprising a BAM phosphor $BaMgAl_{10}O_{17}$:$Eu^{2+}$ and at least one other hexaaluminate that may also be europium activated. The BAM may be mixed with any number of different kinds of hexaaluminates having a similar crystal structure. The aluminum ratio may also be adjusted to alter the defect structure or to produce a second phase. Addition of another hexaaluminate to BAM enhances emission intensity and resistance to degradation, which is beneficial to applications such as plasma display panels.

11 Claims, 4 Drawing Sheets

COMPOSITIONS COMPRISING A MIXTURE OF A BAM PHOSPHOR AND AT LEAST ONE OTHER HEXAALUMINATE

CROSS REFERENCE TO RELATED APPLICATIONS

This application claims priority to U.S. Provisional Application Ser. No. 60/830,269, filed Jul. 11, 2006, and titled "An improved BAM phosphor." U.S. Provisional Application Ser. No. 60/830,269 is incorporated herein by reference in its entirety.

BACKGROUND OF THE INVENTION

1. Field of the Invention

Embodiments of the present invention are directed to phosphor compositions that comprise a BAM phosphor $BaMgAl_{10}O_{17}:Eu^{2+}$ and at least one other hexaluminate that may also be europium activated.

2. Description of the Related Art

Owing to its high light output and excellent display of color (as represented, for example, on a CIE color diagram), the known BAM phosphor $BaMgAl_{10}O_{17}$ doped with divalent europium ($Eu^{2+}$) has been widely used as the blue phosphor component in applications such as fluorescent lamps, light emitting diode (LED) and plasma display panels (PDP). In plasma display panel applications, BAM:Eu is conventionally adopted as the blue-emitting component under vacuum ultraviolet (VUV) excitation; however, considerable degradation in light output and color shift (toward the green) are known to be problematic. This is thought to be due to an annealing procedure during the manufacturing process, as well as to plasma radiation and/or sputtering damage that occurs during day-to-day use.

BAM has a β-alumina structure, and belongs to the family of hexaluminates. Hexaluminates have a column-like structure and consists of blocks of cubic closed packed (CCP) oxygen layers with cations in tetrahedral and octahedral interstices. Because the blocks are quite similar to the $MgAl_2O_4$ spinel structure, hexaluminates are often referred to as "spinel blocks." The blocks are separated by mirror planes, which contain the large cations.

The magnetoplumbite structure is similar to the β-alumina structure as both have identical spinel blocks. The difference between them lies in the mirror planes, which are loosely-packed in the magnetoplumbite case, and tightly-packed in the β-alumina structure. $LaMgAl_{11}O_{19}$ is a typical magnetoplumbite. Structurally, its formula can be rewritten as $[LaAlO_3][(Al_3Mg)A_7O_{16}]$, where $[LaAlO_3]$ are the ions on the mirror plane, and the $[(Al_3Mg)Al_7O_{16}]$ portion of the structure exists as the above-mentioned spinel blocks. In the formula $(Al_3Mg)$ are groups of ions having a 4-fold coordination, and the aluminum as part of the $Al_7$ oxide has a six-fold coordination. In the same manner, β-alumina $BaMgAl_{10}O_{17}$ can be rewritten as $[BaO][(Al_3Mg)A_7O_{16}]$, where just two ions Ba and O are presented on the mirror plane.

Diagrams of the atomic arrangements (and hence crystal structure) of three hexaluminates are shown in FIGS. 1A-1C. FIG. 1A is β-alumina as represented by the formula $NaAl_{11}O_{17}$, which may be re-written as $[NaO][Al_4Al_7O_{16}]$; FIG. 1B is the BAM compound $BaMgAl_{10}O_{17}$, which may be written as $[BaO][(Al_3Mg)Al_7O_{16}]$; and FIG. 1C is the magnetoplumbite $LaMgAl_{11}O_{19}$, which may be written as $[LaAlO_3][(Al_3Mg)Al_7O_{16}]$.

What is needed in the art are phosphor compositions that enhance the emission intensity and degradation resistance of the conventional BAM phosphor ($BaMgAl_{10}O_{17}:Eu^{2+}$), utilizing properties afforded by mixing the conventional BAM phosphor with other hexaluminates.

SUMMARY OF THE INVENTION

Embodiments of the present invention are directed to a phosphor composition comprising a europium activated BAM phosphor and a hexaluminate other than the BAM phosphor, the composition represented by the formula (x) hexaluminate+(1−x) $BaMgAl_{10}O_{17}:Eu^{2+}$, where the hexaluminate is selected from the group consisting of a β-alumina, a β'-alumina, and a magnetoplumbite, and wherein x ranges from about 0.001 to about 0.999.

In another embodiment, the phosphor composition comprises a europium activated BAM phosphor and a hexaluminate other than the BAM phosphor, the composition represented by the formula (x) $LnMAl_{11}O_{19}$+(1−x) $BaMgAl_{10}O_{17}:Eu^{2+}$, where Ln is a trivalent lanthanide, M is a divalent cation, and x ranges from about 0.001 to about 0.5. Alternatively, the phosphor composition comprises a europium activated BAM phosphor and a hexaluminate other than the BAM phosphor, the composition represented by the formula (x) $Ln_uAl_vO_w$+(1−x) $BaMgAl_{10}O_{17}:Eu^{2+}$, where Ln is a trivalent lanthanide, x ranges from about 0.001 to about 0.5, u ranges from about 0.67 to about 1, v ranges from about 11 to about 12, and w ranges from about 18 to about 19.

In another embodiment, the phosphor composition comprises a europium activated BAM phosphor and a hexaluminate other than the BAM phosphor, the composition represented by the formula (x) $M'_{1.5}Al_{10.5}O_{16.5}$+(1−x) $BaMgAl_{10}O_{17}:Eu^{2+}$. Alternatively, the phosphor composition comprises a europium activated BAM phosphor and a hexaluminate other than the BAM phosphor, the composition represented by the formula (x) $M'_{1.5}Al_{10.5}O_{16.5}$+(1−x) $BaMgAl_{10}O_{17}:Eu^{2+}$, where M' is a monovalent cation, and x ranges from about 0.001 to about 0.5.

In another embodiment, the phosphor composition comprising a europium activated BAM phosphor and a hexaluminate other than the BAM phosphor, the composition represented by the formula (x) $M_{0.75}Al_{11}O_{17.25}$+(1−x) $BaMgAl_{10}O_{17}:Eu^{2+}$, where M is a divalent cation, and x ranges from about 0.001 to about 0.5. Alternatively, the phosphor composition comprising a europium activated BAM phosphor and a hexaluminate other than the BAM phosphor, the composition represented by the formula x $(yMO.6Al_2O_3)$+(1−x) $BaMgAl_{10}O_{17}:Eu^{2+}$, where M is a divalent cation, and x ranges from about 0.001 to about 0.5, and y ranges from about 1.28 to about 1.32.

The present phosphor compositions may be synthesized by a method selected from the group consisting of liquid processing methods, co-precipitation methods, and sol-gel methods. Exemplary steps include: (a) dissolving the precursor metal salts in an aqueous based solution; (b) co-precipitating an intermediate product; (c) removing at least a portion of the water the intermediate product of step (b); (d) calcining the product of step (c); and (e) sintering the product of step (d).

BRIEF DESCRIPTION OF THE DRAWINGS

FIG. 1A is β-alumina as represented by the formula $NaAl_{11}O_{17}$, which may be re-written as $[NaO][Al_4Al_7O_{16}]$; FIG. 1B is the BAM compound $BaMgAl_{10}O_{17}$, which may be written as [BaO][(Al₃Mg)Al₇O₁₆]; and FIG. 1C is the magnetoplumbite LaMgAl₁₁O₁₉, which may be written as [LaAlO₃][(Al₃Mg)Al₇O₁₆];

DETAILED DESCRIPTION OF THE INVENTION

Figure 1C:
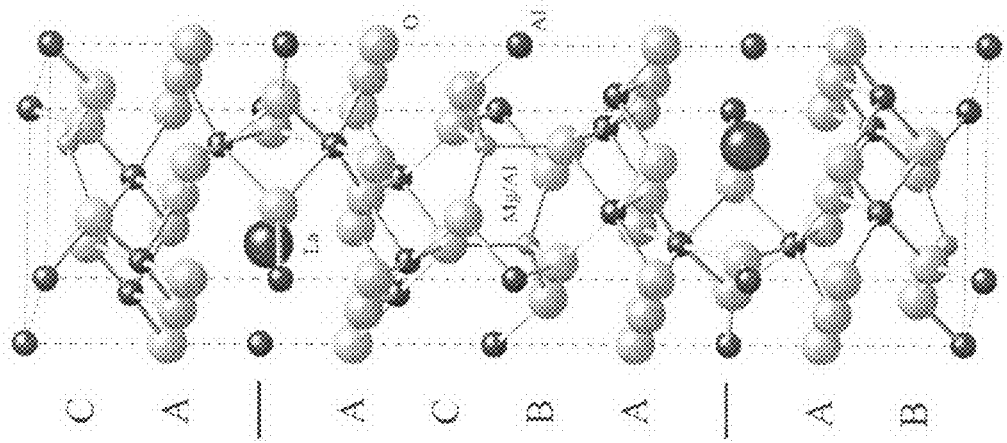
FIGS. 1A-1C are diagrams showing the atomic arrangements (and hence crystal structure) of three hexaluminates.
Figure 1B:
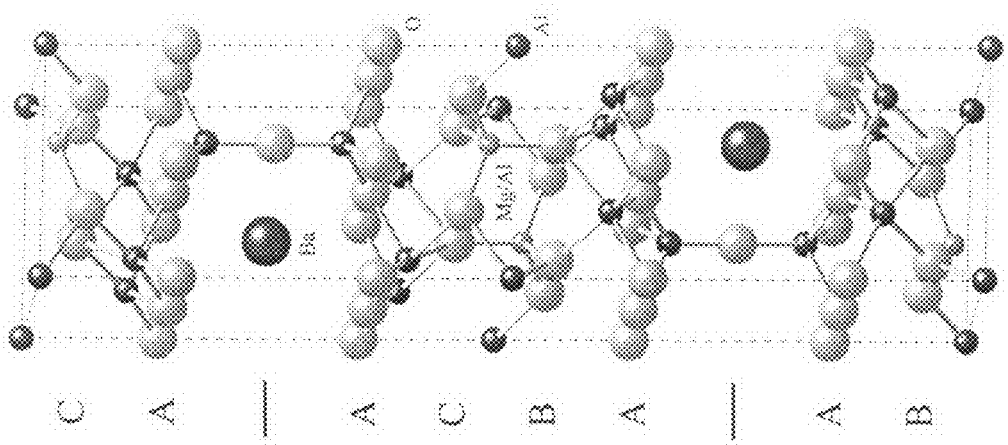
Figure 1A:
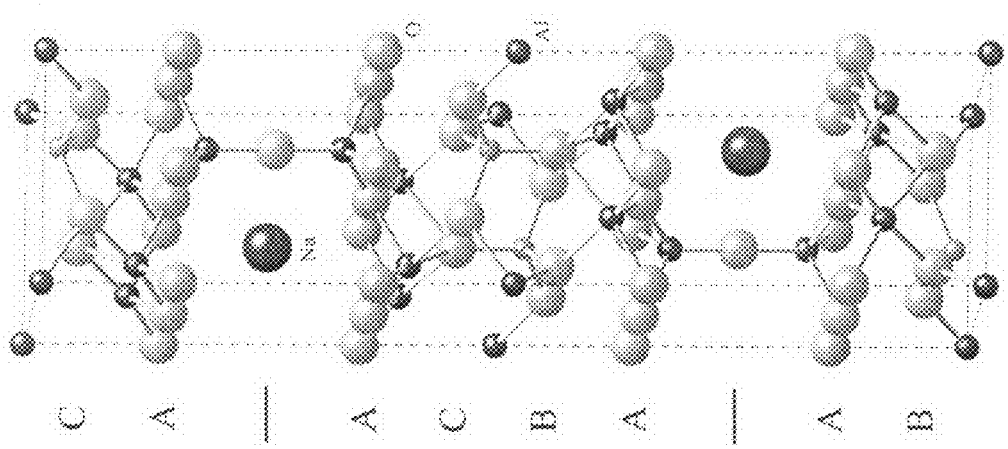

Disclosed herein are phosphor compositions comprising a BAM phosphor BaMgAl₁₀O₁₇ activated with divalent europium (Eu²⁺), and at least one other hexaluminate having a similar crystal structure. The similarity among hexaluminte structures has led the present inventors to synthesize new compositions by mixing various hexaluminates.

Exemplary Formulations

According to embodiments of the present invention, a BAM:Eu²⁺ is mixed with at least one other type of hexaluminate, as represented by the general formula:

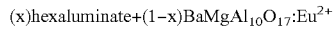
$(x)hexaluminate+(1-x)BaMgAl_{10}O_{17}:Eu^{2+}$ where the (x) hexaluminte includes but is not limited to a β-alumina, a β'-alumina, and a magnetoplumbite, and is not BaMgAl₁₀O₁₇. The phosphor composition mixture may be in the form of a solid solution of the hexaluminate and the BAM:Eu²⁺, or it may contain distinct phases of the hexaluminate and the BAM:Eu²⁺. The value of x in this general formula ranges from about 0.001 to about 0.999.

More specifically, and according to one embodiment of the present invention, the phosphor composition is generated by mixing the BAM phosphor with a magnetoplumbite compound, the phosphor composition represented by the formula:

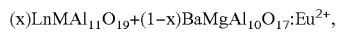
$(x)LnMAl_{11}O_{19}+(1-x)BaMgAl_{10}O_{17}:Eu^{2+}$, where Ln is a trivalent lanthanide, M is a divalent cation, and x ranges from about 0.001 to about 0.5. In some embodiments, M may be an alkaline earth metal from group IIA of the periodic table, the alkaline earth metal selected from the group consisting of Mg, Ca, Sr, and Ba.

According to another embodiment of the present invention, the BAM phosphor may be mixed with a lanthanide-containing hexaluminate compounds according to the formula:

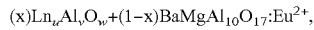
$(x)Ln_uAl_vO_w+(1-x)BaMgAl_{10}O_{17}:Eu^{2+}$, where Ln is a trivalent lanthanide, x ranges from about 0.001 to about 0.5, u ranges from about 0.67 to about 1, v ranges from about 11 to about 12, and w ranges from about 18 to about 19.

While not wishing to be bound by any particular theory, it may be noted that the lanthanide hexaluminate has a magnetoplumbite framework of the type AB₁₂O₁₉, with vacancies in the structure. Ideally, the structure would have the formula Ln₀.₆₇Al₁₂O₁₉, in accordance with a "true" magnetoplumbite structure. However, such structures apparently do not exist as the AB₁₂O₁₉ framework cannot accommodate a sufficient number of vacancies at the A sites. Therefore, it is believed the actual composition of a lanthanide hexaluminate lies somewhere between the stoichiometric LnAl₁₁O₁₈, and the ideal stoichiometry of Ln₀.₆₇Al₁₂O₁₉. An example of such a lanthanide hexaluminate is La₀.₈₅Al₁₁.₆O₁₈.₇.

In another embodiment of the present invention, the BAM phosphor may be mixed with a hexaluminate comprising one or more β-alumina compounds such that the phosphor composition has the formula:

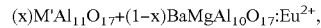
$(x)M'Al_{11}O_{17}+(1-x)BaMgAl_{10}O_{17}:Eu^{2+}$, where M' is a monovalent cation from group IA of the periodic table (an alkali metal), and x ranges from about 0.001 to about 0.5. The M' cation is selected from the group consisting of Li, Na, K, Rb, and Cs.

In another embodiment of the present invention, the BAM phosphor may be mixed with a hexaluminate comprising one or more of the so-called β'-alumina compounds such that the phosphor composition has the formula:

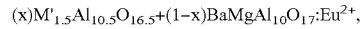
$(x)M'_{1.5}Al_{10.5}O_{16.5}+(1-x)BaMgAl_{10}O_{17}:Eu^{2+}$, where M' is a monovalent cation from group IA of the periodic table (an alkali metal), and x ranges from about 0.001 to about 0.5. The M' cation is selected from the group consisting of Li, Na, K, Rb, and Cs. The assumed structure of β'-alumina has been reported before in the literature; however, whether it is a new phase other than non-stoichiometric β-alumina remains unclear.

In another embodiment of the present invention, the BAM phosphor may be mixed with one or more alkaline-earth-poor (or alkaline earth deficient, at least relative to previous embodiments) hexaluminate compounds, such that the phosphor composition has the formula:

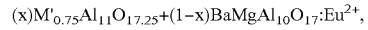
$(x)M'_{0.75}Al_{11}O_{17.25}+(1-x)BaMgAl_{10}O_{17}:Eu^{2+}$, where M is a divalent cation, and x ranges from about 0.001 to about 0.5. The alkaline-earth-poor hexaluminates have a β-alumina structure with about 75 percent of the group IA alkali metal ions being replaced by group IIA alkaline-earth ions and about 25 percent by oxygen ions.

In another embodiment of the present invention, the BAM phosphor may be mixed with one or more alkaline-earth-rich hexaluminate compounds, such that the phosphor composition has the formula:

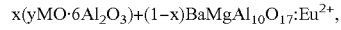
$x(yMO\cdot 6Al_2O_3)+(1-x)BaMgAl_{10}O_{17}:Eu^{2+}$, where M is a divalent cation, and x ranges from about 0.001 to about 0.5, and y ranges from about 1.28 to about 1.32. These alkaline-earth-rich hexaluminates are assumed to have a β'-alumina structure with about 75 percent of the group IA alkali metal ions being replaced by group IIA alkaline-earth ions and about 25% by oxygen ions. This embodiment provides a composition with the ideal structural formula M₁.₁₂₅Al₁₀.₅O₁₆.₈₇₅.

For certain mixtures of BAM:Eu²⁺ and some other hexaluminte, according to the embodiments outlined above, the ratio of the aluminum to the other cations may be varied to enhance luminescence output and oxidation stability. Furthermore, it is believed that by mixing BAM:Eu²⁺ with other hexaluminates according to the present embodiments, oxidative stability and light emission output are enhanced due to changes in the crystal field properties of the overall phosphor composition.

Processing Considerations

The present phosphor compositions may be synthesized by mixing the BAM phosphor BaMgAl₁₀O₁₇ with one or more hexaluminates other than the BAM having a similar crystal structure.

In one embodiment of the present invention, the phosphor composition may be synthesized by mixing the BAM phosphor BaMgAl$_{10}$O$_{17}$ with the β-alumina (NaAl$_{11}$O$_{17}$). The fraction of the β-alumina contained within the composition may be adjusted to vary the light emission behavior and degradation resistance of the overall composition. In this embodiment a composition is mixed having a content of about 20 percent of the β-alumina NaAl$_{11}$O$_{17}$ and about 80 percent of the BAM. The formula of the composition may be represented by the formula:

$$(Na_{0.2}Ba_{0.75}Eu_{0.05}Mg_{0.8}O_{1.7})+x(Al_{10.2}O_{15.3}),$$

where x ranges from about 0.7 to about 1.30.

In one example of the synthesis of the present phosphor composition, the starting materials comprised the appropriate metal nitrates in the desired mole ratios. In one embodiment, a flux may be added during processing, for example, a 5 mole percent addition of a flux such as aluminum fluoride.

Such BAM/hexaluminate compositions have been synthesized by the present inventors using liquid mixing, co-precipitation, and/or sol-gel techniques. In accordance with these processes, metals that included sodium, barium, magnesium, aluminum, and europium, along with salts of halogens such as aluminum fluoride, were first dissolved in hot water. An aqueous solution of ammonia water was added to facilitate co-precipitation of the mixed nitrates. The solution was then heated to remove water, and the partially dried mixture was calcined at about 800° C. for about two hours. Finally, the calcined powders were sintered at about 1500° C. for about 6 hours in an atmosphere comprising nitrogen gas mixed with about 1 to 5 percent by volume hydrogen. After sintering, the powders were milled and sieved with a 25 μm sieve.

Physical Properties and Optical Performance

Figure 2:
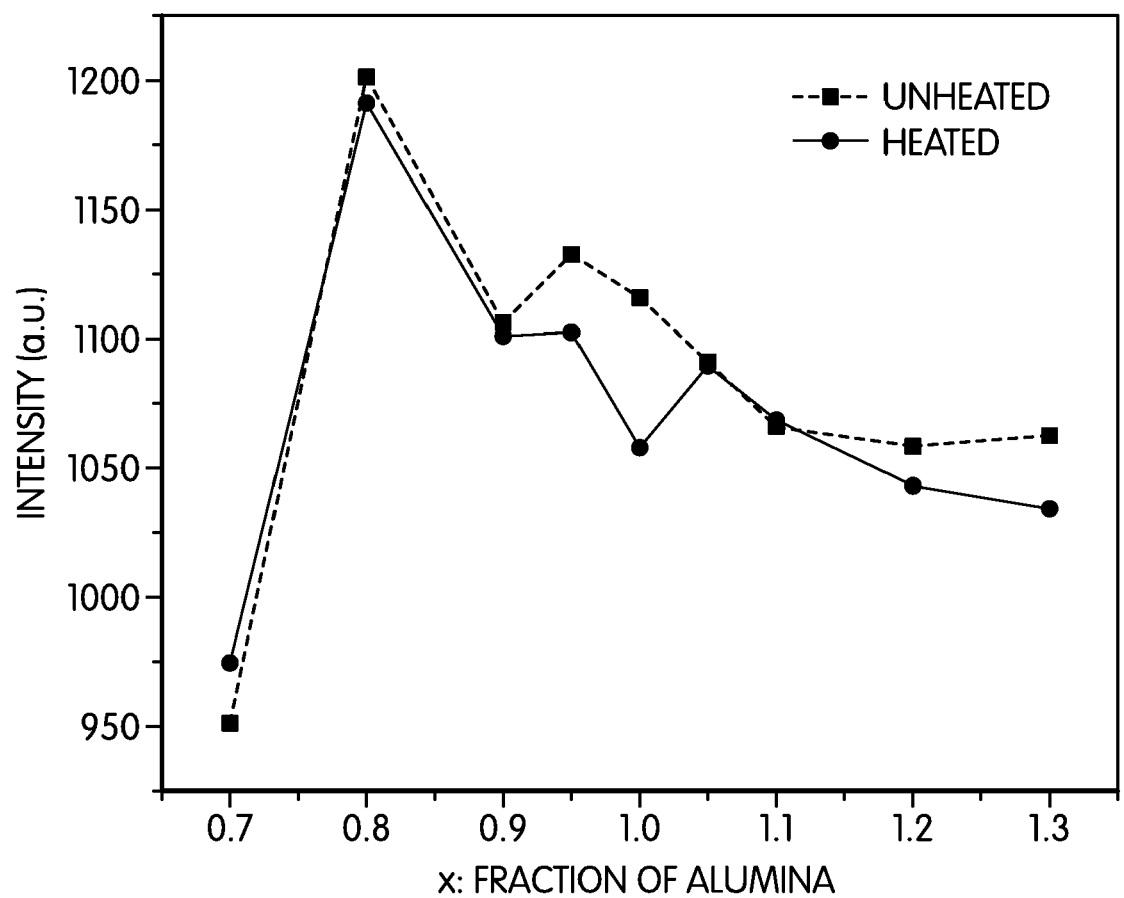
FIG. 2 is a graph of emission intensity vs. fraction of alumina (denoted by "x"), comparing heated and unheated samples.

To perform a thermal degradation test, the powders were heated at about 510° C. for about one hour in air. The emission intensity of un-heated and heated samples were then measured using a 147 nm plasma lamp as the excitation source. Sample compositions and measurement data are shown in Table 1:

FIG. 2 is a graph of emission intensity versus x, the fraction of alumina in the composition. In the graph, the square symbols represent unheated samples, and the circles heated samples. Data in the figure shows that the emission intensity increases dramatically as the fraction of the alumina in the composition is increased from 0.7 to 0.8, and whereas it decreases somewhat from that highest value, the emission intensity is still greater for x fractions of 0.9 to 1.3 than the emission intensity is when x is 0.7.

Figure 3:
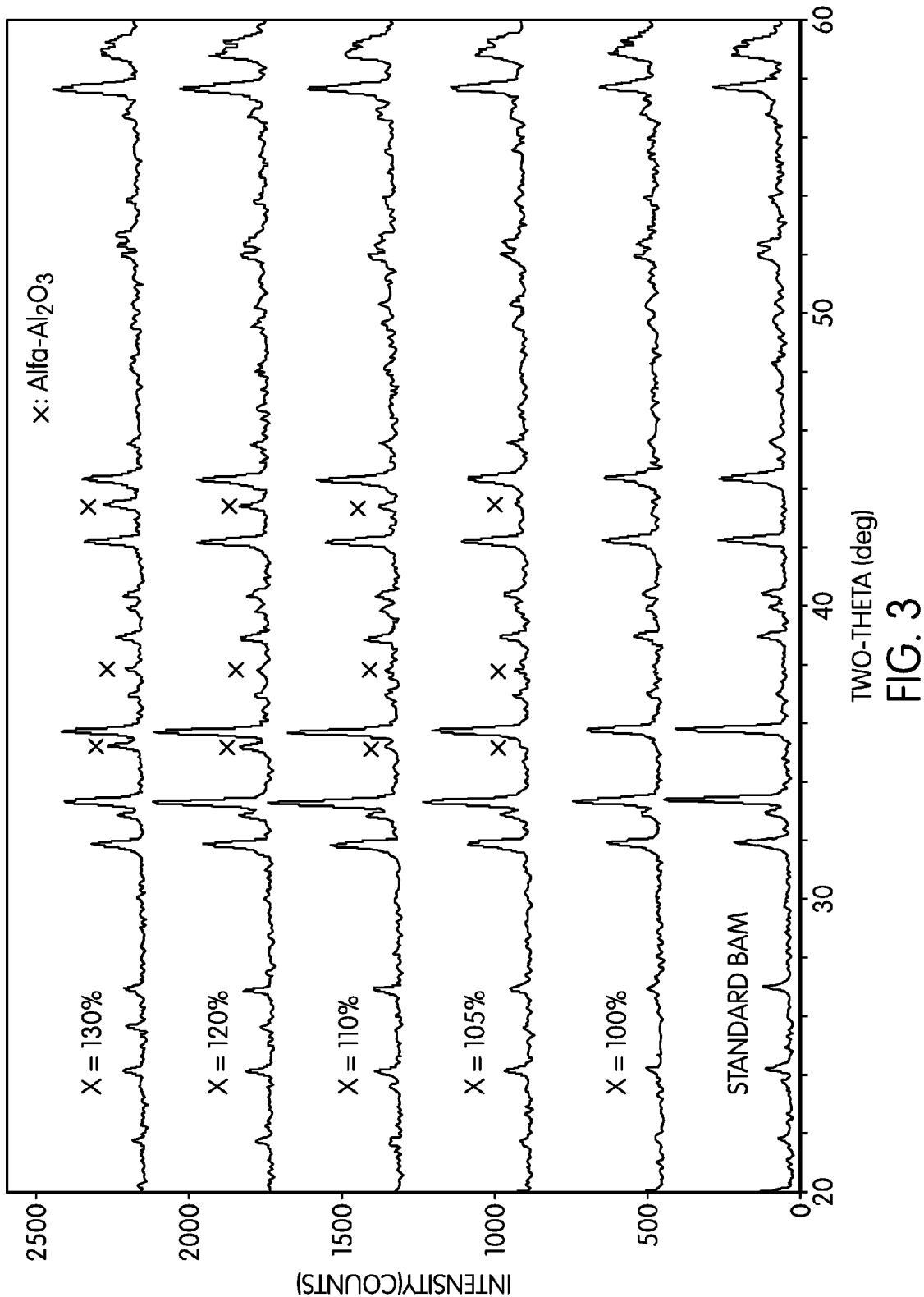
FIG. 3 is an x-ray diffraction (XRD) pattern of the compound $(Na_{0.2}Ba_{0.75}Eu_{0.05}Mg_{0.8}O_{1.7})x(Al_{10.2}O_{15.3})$, where x is greater than or equal to 100 percent (x≧100%)

FIG. 3 is an x-ray diffraction (XRD) pattern of the compound $(Na_{0.2}Ba_{0.75}Eu_{0.05}Mg_{0.8}O_{1.7})x(Al_{10.2}O_{15.3})$, where x is greater than or equal to 100 percent (x≧100%). The diffraction pattern shows a comparison of samples with increasing ratios of aluminum. The data shows that as a second phase of α-alumina became evident as the value of x was increased above 100 percent. The larger the value of x, the more prominent the diffraction peak(s) of the α-alumina became.

Figure 4:
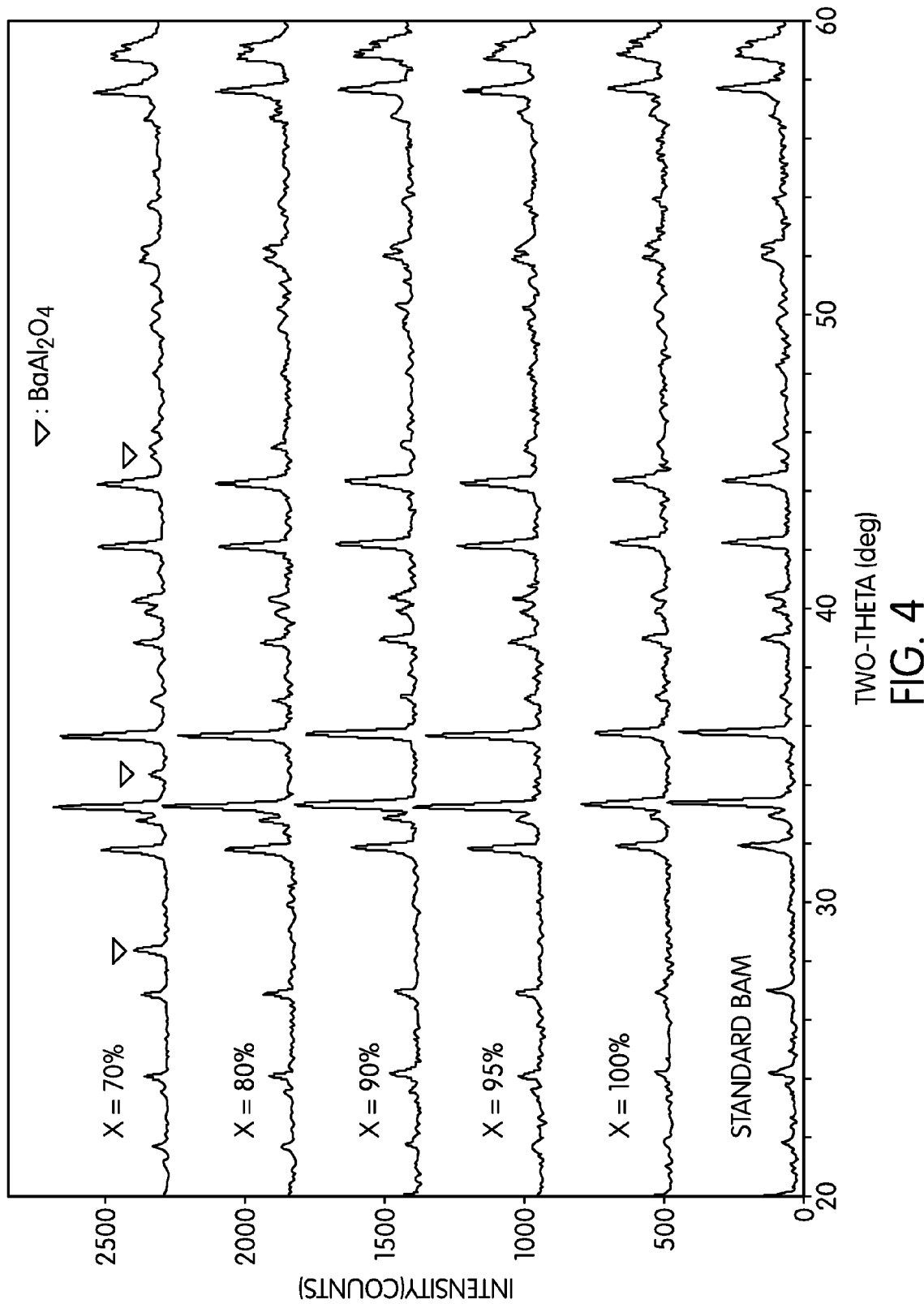
FIG. 4 is an x-ray diffraction (XRD) pattern of the compound $(Na_{0.2}Ba_{0.75}Eu_{0.05}Mg_{0.8}O_{1.7})x(Al_{10.2}O_{15.3})$, where x is less than or equal to 100 percent (x≦100%).

FIG. 4 is an x-ray diffraction (XRD) pattern of the compound $(Na_{0.2}Ba_{0.75}Eu_{0.05}Mg_{0.8}O_{1.7})x(Al_{10.2}O_{15.3})$, where x is less than or equal to 100 percent (x≦100%). In FIG. 4, the diffraction pattern shows a comparison of samples with smaller ratios of aluminum than found in stoichiometrical composition. It was found that a second phase, BaAlO$_2$, was formed when x was decreased to about 70 percent of the stoichiometrical ratio. When x was equal to or less than about 80 percent, no second phase was formed. Furthermore, the β-alumina could not be distinguished from the BAM in the diffraction pattern. Therefore, it could not be determined in this case whether or not β-alumina existed in the form of a second phase.

What is claimed is:

1. A phosphor composition comprising a europium activated BAM phosphor and a hexaaluminate other than the BAM phosphor, the composition represented by the formula:

$$(x)\text{hexaaluminate}+(1-x)BaMgAl_{10}O_{17}:Eu^{2+}$$

where the hexaaluminate is selected from the group consisting of a β-alumina, a β'-alumina, and a magnetoplumbite, and wherein x ranges from about 0.001 to about 0.999, subject to the proviso that the hexaaluminate is not Ba$_{0.75}$Al$_{11}$O$_{17.25}$:Eu$^{2+}$.

TABLE 1

Compositions and photoemission intensities of samples $(Na_{0.2}Ba_{0.75}Eu_{0.05}Mg_{0.8}O_{1.7}) + x(Al_{10.2}O_{15.3})$

| Sample # | x | Compositions | Emission (unheated) | Emission (heated) | Emission change ratio |
|---|---|---|---|---|---|
| Control | | (Ba$_{0.95}$Eu$_{0.05}$)MgAl$_{10}$O$_{17}$ (BAM) | 1097 | 1060 | −4.6% |
| 1 | 70% | Na$_{0.2}$Ba$_{0.75}$Eu$_{0.05}$Mg$_{0.8}$Al$_{7.14}$ | 952 | 975 | +2.4% |
| 2 | 80% | Na$_{0.2}$Ba$_{0.75}$Eu$_{0.05}$Mg$_{0.8}$Al$_{8.16}$ | 1202 | 1191 | −0.91% |
| 3 | 90% | Na$_{0.2}$Ba$_{0.75}$Eu$_{0.05}$Mg$_{0.8}$Al$_{9.18}$ | 1106 | 1102 | −0.36% |
| 4 | 95% | Na$_{0.2}$Ba$_{0.75}$Eu$_{0.05}$Mg$_{0.8}$Al$_{9.69}$ | 1133 | 1102 | −2.7% |
| 5 | 100% | Na$_{0.2}$Ba$_{0.75}$Eu$_{0.05}$Mg$_{0.8}$Al$_{10.2}$ | 1116 | 1058 | −5.2% |
| 6 | 105% | Na$_{0.2}$Ba$_{0.75}$Eu$_{0.05}$Mg$_{0.8}$Al$_{10.71}$ | 1091 | 1090 | −0.1% |
| 7 | 110% | Na$_{0.2}$Ba$_{0.75}$Eu$_{0.05}$Mg$_{0.8}$Al$_{11.22}$ | 1067 | 1069 | +0.2% |
| 8 | 120% | Na$_{0.2}$Ba$_{0.75}$Eu$_{0.05}$Mg$_{0.8}$Al$_{12.24}$ | 1059 | 1044 | −1.4% |
| 9 | 130% | Na$_{0.2}$Ba$_{0.75}$Eu$_{0.05}$Mg$_{0.8}$Al$_{13.26}$ | 1064 | 1036 | −2.6% |

These experiments show that of the data presented, the compositions comprising mixtures of the conventional BAM phosphor (Ba$_{0.95}$Eu$_{0.05}$)MgAl$_{10}$O$_{17}$ with hexaluminates other than that BAM in all cases demonstrate either an increase in intensity, or at least less of an intensity decrease from heating than the control.

2. A phosphor composition comprising a europium activated BAM phosphor and a hexaaluminate other than the BAM phosphor, the composition represented by the formula:

$$(x)LnMAl_{11}O_{19}+(1-x)BaMgAl_{10}O_{17}:Eu^{2+},$$

where Ln is a trivalent lanthanide, M is a divalent cation, and x ranges from about 0.001 to about 0.5.

3. The phosphor composition of claim 2, wherein M is an alkaline earth metal selected from the group consisting of Mg, Ca, Sr, and Ba.

4. A phosphor composition comprising a europium activated BAM phosphor and a hexaaluminate other than the BAM phosphor, the composition represented by the formula:

$$(x)Ln_uAl_vO_w+(1-x)BaMgAl_{10}O_{17}:Eu^{2+},$$

where Ln is a trivalent lanthanide, x ranges from about 0.001 to about 0.5, u ranges from about 0.67 to about 1, v ranges from about 11 to about 12, and w ranges from about 18 to about 19.

5. A phosphor composition comprising a europium activated BAM phosphor and a hexaaluminate other than the BAM phosphor, the composition represented by the formula:

$$(x)M'Al_{11}O_{17}+(1-x)BaMgAl_{10}O_{17}:Eu^{2+},$$

where M' is a monovalent cation, and x ranges from about 0.001 to about 0.5.

6. The phosphor composition of claim 5, wherein the M' cation is selected from the group consisting of Li, Na, K, Rb, and Cs.

7. A phosphor composition comprising a europium activated BAM phosphor and a hexaaluminate other than the BAM phosphor, the composition represented by the formula:

$$(x)M'_{1.5}Al_{10.5}O_{16.5}+(1-x)BaMgAl_{10}O_{17}:Eu^{2+},$$

where M' is a monovalent cation, and x ranges from about 0.001 to about 0.5.

8. The phosphor composition of claim 7, wherein the M' cation is selected from the group consisting of Li, Na, K, Rb, and Cs.

9. A phosphor composition comprising a europium activated BAM phosphor and a hexaaluminate other than the BAM phosphor, the composition represented by the formula:

$$x(yMO.6Al_2O_3)+(1-x)BaMgAl_{10}O_{17}:Eu^{2+},$$

where M is a divalent cation, and x ranges from about 0.001 to about 0.5, and y ranges from about 1.28 to about 1.32.

10. A method of synthesizing a phosphor composition comprising a europium activated BAM phosphor and a hexaaluminate other than the BAM phosphor, the composition represented by the formula:

$$(x)\text{hexaaluminate}+(1-x)BaMgAl_{10}O_{17}:Eu^{2+},$$

wherein x ranges from about 0.001 to about 0.999, and wherein the synthesis method is selected from the group consisting of liquid processing methods, co-precipitation methods, and sol-gel methods, subject to the proviso that the hexaaluminate is not $Ba_{0.75}Al_{11}O_{17.25}:Eu^{2+}$.

11. A method of synthesizing a phosphor composition comprising a europium activated BAM phosphor and a hexaaluminate other than the BAM phosphor, the composition represented by the formula:

$$(x)\text{hexaaluminate}+(1-x)BaMgAl_{10}O_{17}:Eu^{2+},$$

wherein x ranges from about 0.001 to about 0.999, and wherein the synthesis method comprises:
(a) dissolving the precursor metal salts in an aqueous based solution;
(b) co-precipitating an intermediate product;
(c) removing at least a portion of the water from step (b);
(d) calcining the product of step (c); and
(e) sintering the product of step (d).

* * * * *